United States Patent Office 3,167,911
Patented Feb. 2, 1965

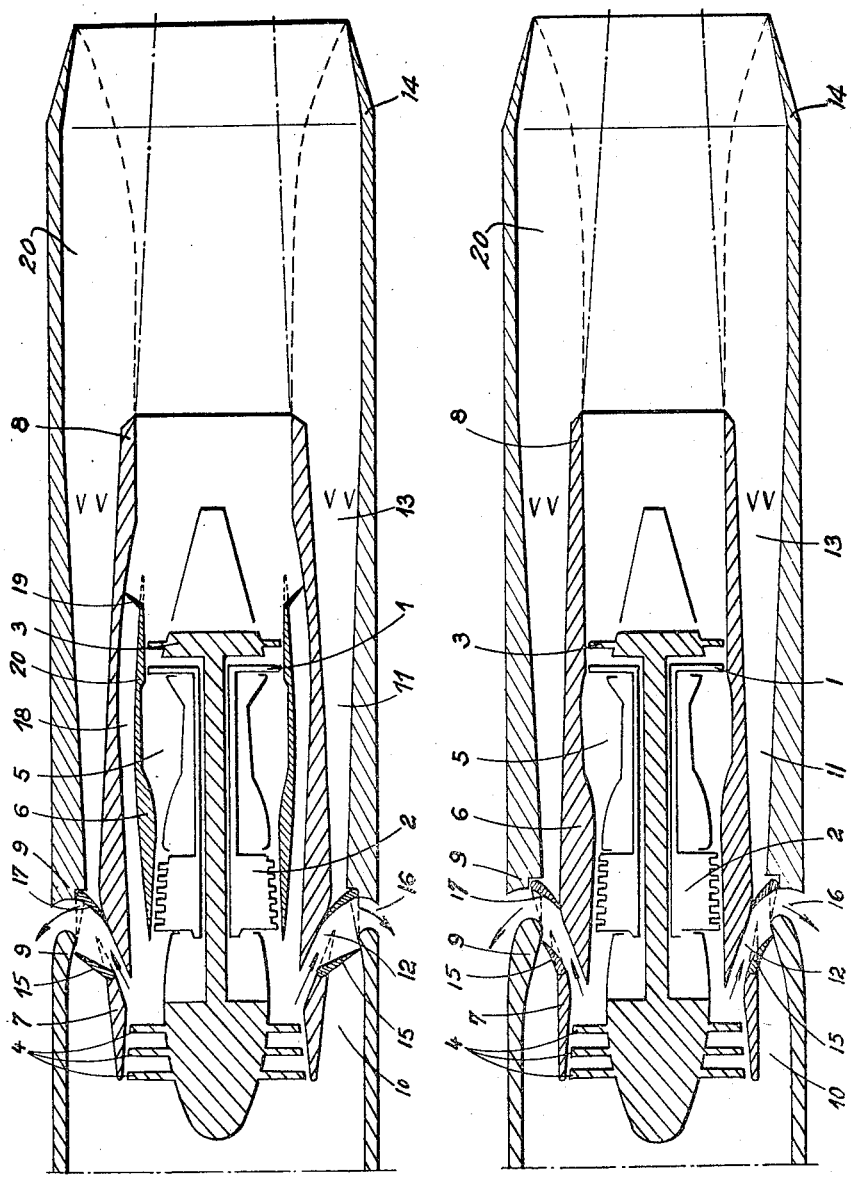

3,167,911
THRUST-REVERSING DEVICE FOR COMBINED TURBOJET-RAMJET UNITS
Pierre Yves Aimable Fernand Sandré, Chatillon-sous-Bagneux, France, assignor to Nord-Aviation Societe Nationale de Constructions Aeronautiques, Paris, France, a joint-stock company of France
Filed Jan. 26, 1962, Ser. No. 168,949
Claims priority, application France, Jan. 27, 1961, 851,008, Patent 1,286,886
10 Claims. (Cl. 60—35.54)

The present invention relates to a thrust-reversing device applicable to jet engines having several fluxes (or gas streams) in which, in normal propulsive operations, the whole of the gases is expelled through a single outlet. Use of the instant invention is particularly indicated in the case of combined turbofan-ramjet engines described hereafter.

Prior to the instant invention numerous devices have been suggested for reversing the direction of thrust of jet engines in order to thereby obtain a braking effect which is indispensible for bringing an aircraft to a halt in a short distance after landing.

These prior devices are generally mounted at the exhaust nozzle of the engine. When they are actuated they deviate towards the front of the aircraft the whole of the jet leaving the exhaust nozzle. This is how straight turbojets and bypass turbofans in which the gases are exhausted by a single jet pipe are equipped. While this arrangement is very efficient it nevertheless has the drawback of exposing to the hot gases the flaps which deviate the jet, and it becomes very difficult to operate in the case of engines destined for very high speed due to the necessary presence of a convergent exhaust nozzle of variable geometry, already very complex by itself.

In the case of prior turbofans in which the two fluxes are exhausted by different outlets, these were eventually equipped at each outlet with a mechanism enabling the two jets to be separately reversed. When a braking effect was desired it was then indispensable to simultaneously operate the mechanisms placed at the outlets of the two jets since these devices do not modify the thrust of the jets. If, for instance, only the jet of the secondary flux leaving the fan were reversed, the jet of the primary flux (or gas stream) being still directed towards the rear, the braking force, while represented by the difference between the thrusts of the two jets, is extremely small and even negative in some cases.

Originality in the present invention resides in supplying a braking force directed forwards on reversing only the jet of the secondary flux leaving the fan, upstream of its junction with the flux leaving the turbines. This latter is not deviated and still escapes rearwards through the normal exhaust nozzle on which there is no need to mount any mechanism whatever.

Its thrust according to the instant invention is automatically reduced, and practically made nil, when the device reversing the secondary flux has been actuated, due to the internal disposition of the motor. The braking force thus obtained can be equal to or greater than half of the thrust normally given by the engine on a test bed.

The thrust reversing device according to the instant invention is essentially characterized by the combination of means for deviating and evacuating in a forward direction the secondary flux leaving the fan with a particular arrangement of the rotors and of the turbofan jet pipe. When the jet engine is a combined turbofan-ramjet engine, for instance of the type hereinafter described, the device is completed by means of annulling the flux from the ramjet.

According to a preferred embodiment of the instant invention, the means for deviating and evacuating in a forward direction the secondary flux leaving the fan comprises a series of mobile flaps and lateral openings formed in the external cowling of the engine, the said openings being shaped so as to deflect to a forward direction the air which passes through them. In the position of propulsive thrust several of these flaps close the said openings, whilst the others are retracted against the inner wall of the outer fairing. In the braking position all of the flaps close the duct leading the secondary flux from the turbofan towards the rear and leave the lateral openings unobstructed.

The particular arrangement of the engine according to the instant invention, due to which the thrust of the primary flux from the turbofan leaving the turbines is annulled when said flaps are located in the braking position is principally characterized by the fact that the engine is extended rearwards by a chamber into which are deviated the different fluxes which are to be ejected by the common exhaust nozzle, the outlet section of the jet pipe of the turbofan being situated, in the said chamber, very distinctly upstream of the outlet section of the exhaust nozzle. The result of this arrangement is that although, in the propulsive thrust configuration, the outlet section of the exhaust nozzle designed for this configuration is used by the whole of the gases ejected by the engine, this section is only used by the primary flux from the turbofan when in the braking configuration. The outlet section of the primary flux is therefore considerably increased when passing from the first configuration to the second, which results, as is explained further on, in a very important reduction of the total outlet pressure and of the thrust of the primary flux.

This phenomenon is greatly enhanced in accordance with the instant invention by a particular arrangement of the rotary portion of the engine, constituted by two mechanically independent rotors, one LP (low pressure) rotor and one HP (high pressure) rotor, the LP compressor of the LP rotor being completely traversed by the whole of the air supplying the turbofan and the distribution of the primary and secondary fluxes being effected at the outlet of the LP compressor. In the braking configuration the turbofan functions as a free turbine turbojet driving the LP compressor, and the thrust produced by the jet through the exhaust nozzle is negligible. The functioning of the combination thereby realized is brought out by means of the examples given hereafter.

When the jet engine is a combined turbojet-ramjet engine, the means for annulling the ramjet flux are constituted, according to a preferred embodiment of the instant invention, by a second series of mobile flaps closing, in the braking position, the duct by which the direct flux for the ramjet is introduced into the engine.

The thrust reversing device of the invention offers the particular advantages; including the following:

(a) The deflected air is cold and the parts subjected to substantial stresses are all located in the cold region and close to the strong portions of the engine,
(b) Absolute air-tightness is not essential,
(c) The outlet section of the turbofan jet pipe is fixed,
(d) This device does not require any special member to be mounted at the rear of the engine whose configuration need not change when passing from normal propulsive functioning to braking functioning. This is particularly interesting in the case of engines destined for high-speed flight which generally require a convergent-divergent exhaust nozzle of variable geometry, the construction of which is often complicated.

Other particular features and advantages will become apparent from the description which follows below of preferred forms of embodiment of the invention, reference being made to the accompanying diagrammatic drawings, in which:

FIG. 1 shows a thrust-reversing device according to the invention, adapted to a turbojet-ramjet, in which the whole of the secondary flux of the turbofan, of the turbofan type, passes into the direct flux of the ramjet.

FIG. 2 shows a device similar to that of FIG. 1, but in which a part of the secondary flux of the turbofan passes into its discharge-nozzle.

Figure 3:
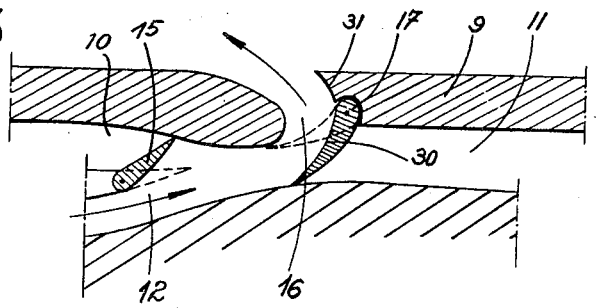
FIG. 3 is a view at a larger scale of one form of construction of the flaps of the first ring.

In FIG. 1, the turbofan is of a conventional type with a double rotor, an HP (high-pressure) rotor constituted by an HP turbine 1, an HP compressor 2 and the shaft which couples them together, and an LP (low-pressure) rotor constituted by an LP turbine 3, an LP compressor 4 and the coupling shaft. The LP turbine 3 is on the downstream side of the HP turbine 1, while the LP compressor 4 is upstream of the HP compressor 2. The shafts of the LP and HP rotors are coaxial.

A combustion system 5 is arranged between the compressor 2 and the turbine 1.

A casing 6 encloses the HP rotor (compressor 2 and turbine 1), and combustion system 5 and the LP turbine 3. A second casing 7 encloses the LP compressor 4.

The casing 6 is extended towards the rear by a discharge-nozzle 8.

It should be noted that the LP compressor 4 is completely traversed by the whole of the flux which supplies the turbofan. At the outlet of the compressor 4, the flux is divided into two parts:

A primary flux which circulates inside the casing 6, passes successively through the compressor 2, the combustion system 5, the turbines 1 and 3, and is discharged through the nozzle 8;

A secondary flux which passes round the casing 6.

An outer casing 9 de-limits the turbofan-ramjet combination and surrounds the turbofan, the discharge-nozzle 8 of which delivers into the interior of this casing 9.

The supply channel 10 of the ramjet is located between the casing 9 of the combination and the front casing 7 of the turbofan. The casing 6 of the turbofan and the casing 9 form between them a channel 11, supplied on the one hand with the direct flux of the ramjet brought in through the channel 10 and on the other hand by the secondary flux of the turbofan, diverted into the said channel 11 through the channel 12 formed between the two casings 7 and 8. These two fluxes are mixed in the channel 11.

The channel 11 delivers into the annular combustion chamber 13 of the ramjet and it is extended towards the rear by the discharge-nozzle 14, common to the various fluxes and fixed on the casing 9.

A first series of movable flaps 15 arranged in the form of a ring, fixed and pivoted on the downstream extremity of the casing 7, enable the outlet section of the channel 12 to be regulated, and can completely close the channel 10 by being applied against the casing 9.

Openings 16 are formed in the casing 9, and their shape is such that they deflect the flux which passes through them towards the front.

In a second series of movable flaps 17, some of these are fixed and pivoted on the lower portion of the downstream walls of the openings 16, and enable either the openings 16 or the channel 11 to be closed; the others are fixed and pivoted on the inner wall of the casing of the ramjet and are applied against the said wall in one position, while they complete the closure of the channel 11 in their other position.

The difference between the combination illustrated in FIG. 2 and that shown in FIG. 1 consists in that a portion of the secondary flux of the turbofan is delivered into its discharge-nozzle 8 through the intermediary of the by-pass 18.

If the whole of the secondary flux is intended to be deflected and directed towards the front through the passages 16, it is therefore necessary to provide a third series of flaps 19, fixed and pivoted on the downstream extremity of the wall 20, limiting the by-pass from the turbofan side.

The reversing device shown in FIG. 3 is the same as that shown in FIGS. 1 and 2, but on a larger scale, so as to illustrate the special shape of the flaps 17 corresponding to the passages 16. The face 30 which receives the secondary flux when the flap is opened is profiled in such manner as to extend in the open position (full lines) the deflecting wall 31 of the passage 16, at the same time completing the coupling to the rear wall of the passage 12 on the casing of the turbofan, and so as not to interrupt in the closed position (broken lines) the continuity of the upper face of the annular intake channel 11 of the ramjet.

Figure 4:
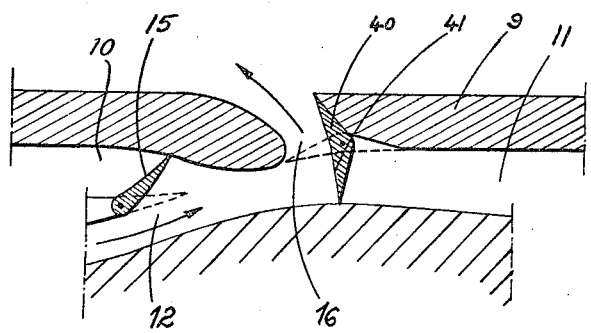
FIG. 4 is a view at a larger scale of a further form of construction of the flaps of the first ring.

In the reversing device shown in FIG. 4, the flap 40 corresponding to the flap 17 of FIG. 3, is constructed in such manner that in the open position (full lines) it serves to close the annular channel 11, and by reason of the profile of its face 41, to deflect the secondary flux which follows the path indicated by the arrows. In the closed position (broken lines), it extends without interruption the inner wall of the casing 9 of the combination. The advantage of a flap of this kind resides in the fact that the relative air speed brings it back automatically to the closed position in the event of any mechanical failure of its actuating device.

Braking is obtained by placing the flaps 15 and 17 (in the case of FIG. 1, without by-pass), or the flaps 15, 17 and 19 (in the case of FIG. 2, with the by-pass 18), in the positions shown in full lines in FIGS. 1 and 2, this having the effect, since the speeds of rotation of the LP and HP rotors are adapted to these conditions of operation, of closing the intake channel 10 of the ramjet and the channel 11 in which are mixed the direct flux of the ramjet and the secondary flux of the turbofan, and in addition, in the case of FIG. 2, to close the outlet of the by-pass 18 into the discharge-nozzle 8 of the turbofan.

Emphasis should be laid here on the fact that the device according to the invention does not comprise any mechanism for varying the section of the discharge-nozzle 8 of the turbofan.

The principle of operation is as follows:

By virtue of the arrangement of the two compressors, for a given speed of rotation of the LP rotor, the flow-rate of the secondary flux can be increased and the flow of the primary flux reduced by increasing the outlet section of the secondary flux and reducing the speed of rotation of the HP rotor. It is even possible to carry out this operation without displacing the operating point of the LP compressor, that is to say while retaining its compression ratio and the flow-rate which it absorbs.

Reduction of the speed of rotation of the HP rotor results in a reduction of the pressure at the outlet of the HP turbine 1.

The power necessary for driving the LP compressor 4 is not altered if its normal point of operation is maintained. This power is supplied by the LP turbine 3. As the flow-rate of the intake of this turbine is reduced, the pressure drop across it must increase.

These different effects result in a considerable reduction of the pressure at the outlet of the primary flux, and correlatively, a substantial reduction of the outlet speed of the primary jet. The thrust supplied by the primary jet, which is the product of its flow-rate times its speed, is therefore considerably reduced and can be practically annulled. On the other hand, the thrust of the secondary flux is increased, since the rate of flow of this flux is increased. The turbofan then functions as a turbo-propulsion unit with a free turbine driving the LP compressor 4.

In the braking position, the flaps 15 close the channel 10 and the flaps 17 close the channel 11 (FIG. 1). The secondary flux is then evacuated through the passages 16 which direct it forwards. The outlet section of these passages 16 is determined in accordance with the increased secondary flow corresponding to this particular type of operation.

Finally, in order that this operation may be possible, it is necessary for the outlet section of the primary flux to be greatly increased, by reason of the reduction in the outlet speed of this flow. This result is very simply obtained in the device described, without there being any necessity to provide an adjustable outlet on the discharge-nozzle 8, on the one hand in view of the appreciable distance existing between the outlets of the discharge-nozzles 8 and 14 of the turbofan and of the ramjet, and on the other hand because the section of the outlet of the discharge-nozzle 14 is substantially greater than the section of the outlet of the discharge-nozzle 8. In the braking position, the outlet section of the primary jet is in fact represented by the whole of the outlet section of the discharge-nozzle 14, since the channel 11 is no longer supplied and is closed by the flaps 17. This section, normally provided for evacuating the primary jet and the mixture proceeding from the channel 11, is much greater than the outlet section of the discharge-nozzle 8. If however a regulating device is provided for other reasons on the said discharge-nozzle 14, there is obviously an advantage in utilizing the regulation giving the largest outlet section in the braking position.

The primary air flow envelopes in the exhaust nozzle for propulsive and braking configurations is indicated in FIGS. 3 and 4. The dashed line extending from the end of discharge-nozzle 8 to the end of nozzle 14 shows the envelope of the turbofan primary air flow exhaust in the braking configuration. The dot-dashed line extending from the end of nozzle 8 shows the envelope of the turbofan primary air flow exhaust in the propulsive configuration, that is, with the ramjet air duct open.

Finally, it should be observed that if only the flaps 15 are closed in FIG. 3, there is thus created a turbofan with an after-burning system in its by-pass, since the supply channel 11 has become a by-pass.

In the result, the invention is also applicable to an isolated turbofan, with or without after-burning, since this after burning is always extinguished during braking.

I claim:
1. A combined turbojet-ramjet engine with thrust-reversing device, said turbojet being a turbofan, comprising:
 (a) a turbofan casing,
 (b) a turbofan in said casing, comprising two concentric and mechanically independent rotors, one rotor having a low-pressure compressor and turbine and the other rotor having a high-pressure compressor and turbine, and a combustion system,
 (c) said casing comprising two portions, one a fore portion surrounding the low-pressure compressor and the other a central portion surrounding the high-pressure compressor, the combustion system and the turbines,
 (d) a jet pipe terminating the downstream extremity of said casing with respect to the general direction of flow of air through said turbofan,
 (e) the low-pressure compressor being traversed by the whole of said air passing into said turbofan,
 (f) an outer casing, concentric with and surrounding said turbofan casing,
 (g) a ramjet engine within said outer casing and comprising sequentially, with respect to said general direction of flow of said air, an annular feed duct defined between said outer casing and said turbofan casing, an annular combustion chamber surrounding said jet pipe, and an exhaust nozzle, the outlet section of said turbofan jet pipe being located within said outer casing at a substantial distance upstream, with respect to said direction of flow of said air, of the outlet section of said exhaust nozzle,
 (h) first passage means through said turbofan casing located between said fore portion and said central portion, air passing into said turbofan being divided, on leaving said low-pressure compressor, into a primary air flow passing through said high-pressure compressor, said combustion system and said turbines, and a secondary air flow passing through said first passage means to intermingle with a direct air flow through said ramjet annular feed duct,
 (i) second passage means through said outer casing located adjacent to and slightly downstream of said first passage means,
 (j) means for shutting off said direct air flow through said ramjet duct and simultaneously deviating and evacuating said secondary air flow outwards and forwards, with respect to said direction of said air flow, through said second passage means,
 (k) the thrust due to said primary air flow being reduced without being deviated when said means for shutting off said direct air flow through said ramjet duct and simultaneously deviating and evacuating said secondary air flow outwards and forwards, with respect to said direction of said air flow, through said second passage means are actuated.

2. A combined turbojet-ramjet with thrust-reversing device according to claim 1, in which the said second passage means comprise transverse openings and said means for shutting off said direct air flow through said ramjet duct and simultaneously deviating and evacuating said secondary air flow outwards and forwards, with respect to said direction of said air flow, through said second passage means, comprise a first series of movable flaps located downstream of said transverse openings, a plurality of said flaps being adapted to shut off said openings and the remainder of said flaps being applied against the inner surface of said outer casing when in an inoperative returned position, and all of said flaps of said first series being adapted to close off air flow through said ramjet annular feed duct downstream of said openings when in an operative braking position, and a second series of movable flaps being located upstream of said first passage means and adapted to shut off air flow through said ramjet annular feed duct upstream of said first passage means when in an operative braking position, the downstream profiles of said second passage means being shaped to deflect a flow of air therethrough radially outwards and forwards of said combined engine when said first and second series of flaps are in said operative braking position.

3. A combined turbojet-ramjet with thrust-reversing device according to claim 2, in which a plurality of said first series of movable flaps are pivoted at the inner downstream edge of said openings formed in said outer casing.

4. A combined turbojet-ramjet engine with thrust-reversing device according to claim 2, wherein the downstream surface of said flaps of said first series of flaps when in said braking position is contoured as a smooth continuation of the downstream contour of said first and second passage means.

5. A combined turbo-jet-ramjet engine with thrust-reversing device according to claim 2, in which each flap of said first series of flaps is adapted to rotate against said direction of air flow in said ramjet annular feed duct in passing from said inoperative to said operative braking position whereby, in the event of mechanical failure, each said flap automatically returns to said inoperative position thereby shutting off said opening formed in said outer casing.

6. A combined turbojet-ramjet engine with thrust-reversing device, said turbojet being a turbofan, comprising in combination:
  (a) a turbofan casing,
  (b) a turbofan in said casing, comprising two concentric and mechanically independent rotors, one rotor having a low-pressure compressor and turbine and the other having a high-pressure compressor and turbine, and a combustion system,
  (c) said casing comprising two portions, one a fore portion surrounding the low-pressure compressor and the other a central portion surrounding the high-pressure compressor, the combustion system and the turbines,
  (d) a jet pipe terminating the downstream extremity of said casing with respect to the general direction of flow of air through said turbofan,
  (e) an inner casing inside and concentric with said central portion of said turbofan casing, extending from adjacent the front extremity of said high-pressure compressor to adjacent the rear extremity of said low-pressure turbine and defining a bypass duct with said central portion of said turbofan casing,
  (f) said low-pressure compressor being traversed by the whole of said air passing into said turbofan,
  (g) an outer casing, concentric with and surrounding said turbofan casing,
  (h) a ramjet engine within said outer casing and comprising sequentially, with respect to said general direction of flow of said air, an annular feed duct defined between said outer casing and said turbofan casing, an annular combustion chamber surrounding said jet pipe, and an exhaust nozzle,
  (i) the outlet section of said turbofan jet pipe being located within said outer casing at a substantial distance upstream, with respect to said direction of flow of said air, of the outlet section of said exhaust nozzle,
  (j) first passage means through said turbofan casing located between said fore portion and said central portion, air passing into said turbofan being divided, on leaving said low-pressure compressor, into a primary air flow passing through said high-pressure compressor, said combustion system, and said turbines, and a secondary air flow of which a first portion passes through said first passage means to intermingle with a direct air flow in said ramjet annular feed duct, and a second portion of said secondary air flow passes through said bypass duct into said jet pipe of said turbofan,
  (k) second passage means through said outer casing located adjacent to and slightly downstream of said first passage means,
  (l) means for shutting off said direct air flow through said ramjet duct and simultaneously deviating and evacuating said secondary air flow outwards and forwards, with respect to said general direction of said general direction of said air flow, through said second passage means,
  (m) the thrust due to said primary air flow being reduced without being deviated when said means for shutting off said direct air flow through said ramjet duct and simultaneously deviating and evacuating said secondary air flow outwards and forwards, with respect to said general direction of said air flow, through said second passage means are actuated.

7. A combined turbojet-ramjet with thrust-reversing device according to claim 6, in which said second passage means comprise transverse openings and said means for shutting off said direct air flow through said ramjet duct and simultaneously deviating and evacuating said secondary air flow outwards and forwards, with respect to said general direction of said air flow, through said second passage means comprise a first series of movable flaps located downstream of said transverse openings, a plurality of said flaps being adapted to shut off said openings and remainder of said flaps being applied against the inner surface of said outer casing when in an inoperative retracted position, and all of said flaps of said first series being adapted to close off air flow through said ramjet annular feed duct downstream of said openings when in an operative braking position, a second series of movable flaps located upstream of said first passage means and being adapted to shut off air flow through said ramjet annular feed duct upstream of said first passage means when in an operative braking position, the downstream profiles of said first and second passage means being shaped to deflect a flow of air therethrough radially outwards and forwards of said combined engine when said first and second series of flaps are in said operative braking position, and a third series of movable flaps adapted to shut off said bypass duct, thereby preventing communication between said bypass duct and said turbofan jet pipe.

8. A bypass turbojet engine with thrust-reversing device comprising in combination:
  (a) two concentric and mechanically independent rotors, one rotor having a low-pressure compressor and turbine and the other rotor having a high-pressure compressor and turbine, and a combustion system,
  (b) an inner casing surrounding the high-pressure compressor, the combustion system and the turbines,
  (c) a jet pipe terminating the downstream extremity of said inner casing with respect to the direction of the flow of air through said turbofan,
  (d) an outer casing concentric with said inner casing and defining therewith a bypass duct, said outer casing enclosing said inner casing, said two rotors and said combustion system,
  (e) an exhaust nozzle terminating the downstream end of said outer casing, said exhaust nozzle being located at a substantial distance downstream of said jetpipe,
  (f) said low-pressure compressor being traversed by the whole of said air passing through said by-pass turbojet.,
  (g) said air being divided on leaving said low-pressure compressor into a primary air flow passing through said high-pressure compressor, said combustion system and said turbines, and a secondary air flow passing directly through said bypass duct to said exhaust nozzle,
  (h) passage means formed in said outer casing adjacent and downstream of said low-pressure compressor,
  (i) means for shutting off said secondary air flow in said bypass duct and for deviating and evacuating said secondary air flow through said passage means in a forward direction with respect to the general direction of said air flow through said turbofan,
  (j) the thrust due to said primary air flow being reduced without being deviated when said means for shutting off said secondary air flow in said bypass duct and for deviating and evacuating said secondary air flow through said passage means in a forward direction with respect to the general direction of said air flow through said turbofan, are actuated.

9. A bypasss turbojet with thrust-reversing device according to claim 8, wherein said passage means comprise transverse openings formed in said outer casing of said by-pass turbojet, and said means for shutting off said secondary air flow in said bypass duct and for deviating and evacuating said secondary air flow through said passage means in a forward direction with respect to the general direction of said air flow through said turbofan comprise
  (a) a series of movable flaps located at the upstream end of said bypass duct, a plurality of said flaps being adapted to close said transverse openings and the remainder of said flaps being adapted to lie against the inner surface of said outer casing when in an inoperative position, and all of said flaps being adapted to shut off said bypass duct when in an operative braking position, the downstream profile of said transverse openings being shaped to deflect a flow of air therethrough in the forward upstream direction when said means for shutting off said secondary air flow in said bypass duct and for deviating and evacuating said secondary air flow through said passage means in a forward direction with respect to the general direction of said air flow through said turbofan are in said braking position.

10. A by-pass turbojet engine with thrust-reversing device according to claim 9, wherein an afterburner is mounted adjacent the downstream end of said jet pipe with respect to said direction of flow of said air through said turbojet.

References Cited by the Examiner

UNITED STATES PATENTS

| | | | |
|---|---|---|---|
| 2,696,079 | 12/54 | Kappus | 60—35.6 |
| 3,036,431 | 5/62 | Vdolek | 60—35.54 |

FOREIGN PATENTS

| | | |
|---|---|---|
| 1,086,315 | 8/54 | France. |

SAMUEL LEVINE, *Primary Examiner.*